Patented May 25, 1943

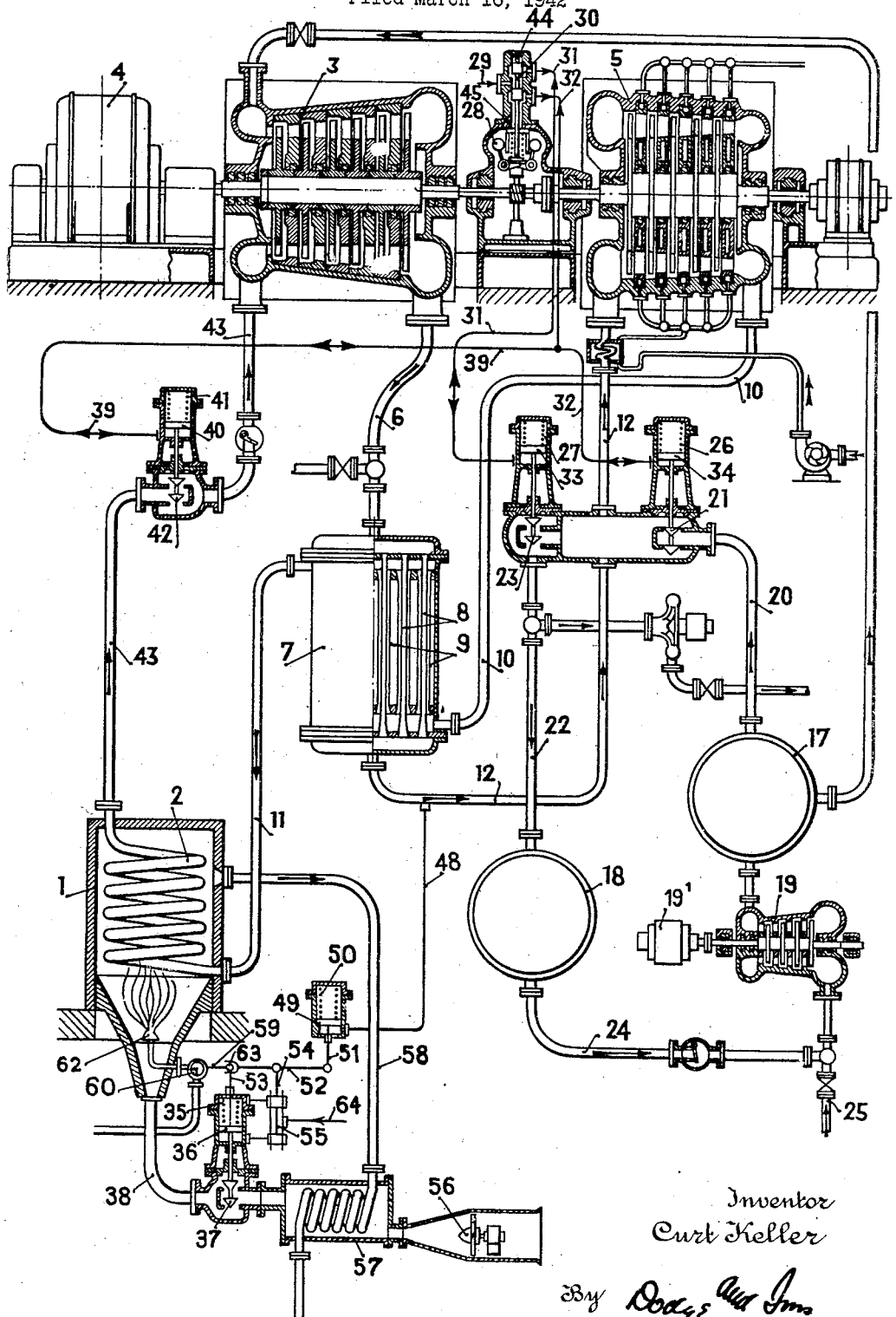

2,319,995

UNITED STATES PATENT OFFICE 2,319,995

OVERLOAD WORKING METHOD FOR THERMAL POWER PLANTS

Curt Keller, Zurich, Switzerland, assignor to Aktiengesellschaft fuer Technische Studien, Zurich, Switzerland, a corporation of Switzerland Application March 16, 1942, Serial No. 434,959
In Switzerland April 7, 1941

3 Claims. (Cl. 60—59).

This invention relates to a method for the overload working of thermal power plants in which a gaseous working medium, preferably air, continuously describes a cycle under pressure above atmospheric, whereby the working medium, the temperature of which has been raised by a supply of heat from an outside source, is allowed to expand in at least one turbine while giving up energy externally, after which it is again brought to a higher pressure in at least one turbo-compressor. Hereby the density of the circulating working medium is varied approximately proportionally to the momentary power delivered externally by the turbine.

Power plants of this kind are designed for normal or maximum load, whereby the admissible maximum temperatures at given pressures are dependent on the characteristics of the materials to be used. Such plants offer the unique advantage that the higher outputs required for overload working can be produced by simply raising the pressure level throughout the cycle, the speed of the turbines thereby remaining unchanged. In order to make use of this circumstance, the temperature of the working medium is, according to the present invention, lowered more and more as the overload increases. Hereby a drop in the efficiency of the thermal power plant during overload working cannot be avoided, since in plants of the type in question the overall efficiency is, when the other conditions remain unchanged, solely dependent on the temperature, the absolute pressure and the pressure ratio between high and low pressure sections being without influence on the efficiency. On the other hand, the novel working method ensures that also during overload working, i. e. when the pressure level in the cycle is higher than at normal load, the value of the creep resistance, as valid for the conditions prevailing at normal load, is not exceeded. The greater stressing of the various parts of the plant due to the higher pressure is compensated by the foregoing lowering of the temperature, which makes higher creep limits admissible. The possibility of overload working whilst the machines run at unchanged speed is, however, in many cases of such importance that a somewhat lower efficiency at part load can readily be accepted. In this connection it is a particularly important advantage that in the ranges of high temperatures (500–700° C.) for which the method according to this invention is intended, drops in temperature involve a relatively great upward shifting of the creep limits. For example there are special steel alloys for which the creep limit at 600° C. is approx. 20% higher than at 650° C., whilst at 550° it is about 33% higher than at 600° C. In the latter case a drop in temperature of 50° C. accordingly permits of the pressure level within the cycle being raised by 33%.

In the accompanying drawing is shown by way of example a form of a plant for carrying out the new method, whereby it is assumed that air is employed as the working medium.

Reference 1 denotes a heater, in which heat is supplied to the air describing a cycle at a pressure above atmospheric. This heater 1 represents the point at which heat from an external source is introduced into the cycle. The actual heating of the air is effected in a surface heat exchanger 2, around which the combustion gases flow. The air heated in this manner passes to a multi-stage air turbine 3 of the axial flow type in which it expands, hereby giving up energy to a generator 4 and to a turbo-compressor designed as a multi-stage axial flow blower 5. The air issuing from the turbine 3 passes through piping 6 into a heat exchanger 7 designed as a countercurrent apparatus, in which it flows through a system of tubes 8, thereby giving up heat to that part of the working medium which flows through a system of tubes 9. Each tube of the system 8 is surrounded by a tube of the system 9. This latter system is connected by a piping 10 to the axial blower 5 and by a piping 11 to the surface heat exchanger 2. The expanded air cooled in the heat exchanger 7 passes through a piping 12 into the turbo-compressor 5, wherein it is recompressed to a higher pressure whilst being cooled between the compressor stages. Hereafter the air is forced through the piping 10 into the heat exchanger 7.

The regulation of governing of load fluctuations which arise in a plant of the kind described, is effected by changing the density of the working medium describing the closed cycle approximately proportionally to the momentary power given up externally by the turbine 3, the speeds of turbine 3 and compressor 5 being maintained unchanged. Accordingly, the pressure, i. e. the weight (in kg./sec.) of working medium flowing through the different points of the closed cycle is changed, the pressures at the different points of the cycle varying thereby approximately proportionally to the momentary power delivered externally by the turbine, whilst the heat drops and velocities of flow in the turbine 3 and compressor 5 remain practically unchanged. Such a method of regulation is described in the U. S. A. Patent No. 2,172,910, granted Sept. 12, 1939. According to said method working medium is temporarily supplied to or withdrawn from the cycle. For this purpose reservoirs 17 and 18 are provided, the reservoir 17 being connected to a compressor 19, which is driven by motor 19¹ and delivers air inhaled from the atmosphere into same. The reservoir 17 is further connected by a piping 20 to an inlet valve 21. On the other hand the reservoir 18 is connected through a piping 22 to a discharge valve 23 and by means of a piping 24 to the suction piping 25 of the compressor 19. According to the adjustment of the valves 21, 23, the air flows either from the reservoir 17 into the closed cycle or from the latter into the reservoir 18. The adjustment of these valves 21, 23 which are urged in a closing direction by means of a spring 26 and 27 respectively, is effected automatically in dependence on the momentary power delivered externally by the turbine 3. This adjustment can conveniently be effected by means of an oil pressure control influenced by the governor 28 of the turbine 3, or by the governor of the machine 4 driven by the turbine 3. This oil pressure control comprises a piping 29 through which a liquid under pressure is supplied. It further comprises a distributing piston 30, which controls the connection of the piping 29 with two pipings 31, 32. The piping 31 is connected to the space below a piston 33 influenced by the spring 27, whilst the piping 32 is connected to the space below a piston 34 influenced by the spring 26. A piping 39 which branches off from the piping 32, is connected to the space below a piston 40 influenced by a spring 41. This piston 40 controls the position of a throttle valve 42, fitted in the piping 43 connecting the heat exchanger 2 to the inlet of the turbine 3. 44 and 45 are outlets provided in the casing of the distributing piston 30 through which oil under pressure can flow out of the oil pressure control system. A piping 48, which branches off from the piping 12 of the cycle described by the working medium, is connected to the space below a piston 49 influenced by a spring 50. The spring 50 is so stressed that the piston will be held in its lowermost position as shown in the drawing, except when pressure in the circuit rises above the maximum permissible in the normal operating range. The piston 49 is linked by a rod 51 to a lever 52 to which are further linked by a rod 53 a piston 36 and by a rod 54 a distributing piston 55. The piston 36 influenced by a spring 35 controls the position of a valve 37 which is fitted in the piping 38, through which combustion air is supplied to the heater 1. This combustion air is forced by a blower 56 into a heat exchanger 57, to which the waste gas leaving the heater 1 is supplied through a piping 58. The lever 52 is also operatively connected to an arm 59 rigidly connected to a valve 60 which controls the supply of fuel to the burner 62 of the heater 1.

The described means for lowering the temperature of the air describing a closed cycle during overload working of the plant, operate as follows: If the load on the generator 4 should increase beyond normal load, the air turbine 3 has the tendency to run slower. The speed governor 28 therefore moves the distributing piston 30 downwards so that fluid under pressure from the piping 29 can flow over to the piping 32, so that the valve 21 is opened and accordingly air is free to pass from the reservoir 17 into the closed cycle described by the working medium. The pressure, and accordingly also the density of the air circulating in the closed circuit becomes greater, whereby the total volume flowing past a given point of the cycle in a given time remains the same. Thus, a rise of pressure also occurs in the piping 12 of the circuit, this rise being transmitted through piping 48 to the lower side of the piston 49, so that the lever 52 is rocked at first in an anti-clockwise sense about fulcrum 63. As a result of this the distributing piston 55 is raised and oil under pressure can thus pass from the piping 64 to the upper side of the piston 36, so that the valve 37 is lowered and the combustion air supplied through pipe 38 to the heater 1 throttled. Owing to the operative connection provided between the lever 52 and the arm 59, the latter is turned in a clockwise sense on the piston 36 being moved downwards, so that the valve 60 also throttles the admission of fuel to the burner 62. Any increase in pressure in the circuit described by the working medium therefore causes practically simultaneously a throttling of the combustion air flowing through piping 38 and of the fuel passing through valve 60, so that the temperature in the heater 1 is lowered. The drop in temperature is thus correlated to the pressure rise in piping 12 of the circuit described by the working medium.

When overloads have to be dealt with, the novel method is preferably carried out in such a manner that the temperature of the working medium is reduced sufficiently to prevent the stresses resulting from the increased working pressure exceeding at any point of the plant the admissible creep limits. This applies to all parts of the plant and in particular to the auxiliary apparatuses and piping.

What is claimed is:

1. A method of working thermal power plants of the type in which a gaseous medium, preferably air, continuously describes a cycle under pressure above atmospheric and in which heat is supplied to the working medium from an external source of heat, and the working medium thus heated is caused to expand in a turbine while doing external work and is then recompressed in a compressor, and in which the temperatures and pressures stress the materials almost to their creep limits; said method comprising varying the density of the working medium approximately proportionately to the momentary power delivered externally whilst keeping constant the speeds of the turbine and compressor; simultaneously maintaining the temperatures at different points in the circuit substantially constant while the power plant operates within the normal load range; and during operation in the overload range, lowering said temperatures more and more as the overload increases.

2. A method of working thermal power plants of the type in which a gaseous medium, preferably air, continuously describes a cycle under pressure above atmospheric and in which heat is supplied to the working medium from an external source of heat, and the working medium thus heated is caused to expand in a turbine while doing external work and is then recompressed in a compressor, and in which the temperatures and pressures stress the materials almost to their creep limits; said method comprising varying the density of the working medium approximately proportionately to the momentary power delivered externally whilst keeping constant the speeds of the turbine and compressor; simultaneously maintaining the temperatures at different points in the circuit substantially constant while the power plant operates within the normal load range; and during operation in the overload range lowering the temperature of the working medium in relation to the amount that the pressure of the working medium exceeds the maximum pressure permissible in the normal working range.

3. The combination of a thermal power plant of the type in which a gaseous medium, preferably air, continuously flows in a closed circuit under pressures above atmospheric, and in which heat is supplied to the working medium from an external source of heat, the working medium thus heated being caused to expand in a turbine while doing external work and being then recompressed in a compressor and again heated; primary speed responsive governing means serving to vary the density of the working medium by supplying and withdrawing working medium to and from the circuit, while maintaining the temperatures at different points in the circuit substantially constant; and a secondary governor serving in response to excess pressure occasioned by overload, to lower said temperatures by amounts approximately proportional to such excess.

CURT KELLER.